United States Patent
Sheth et al.

(10) Patent No.: US 10,693,837 B2
(45) Date of Patent: Jun. 23, 2020

(54) SYSTEM FOR AND METHOD OF RANKING DOMAIN NAMES BASED ON USER PROPERTIES

(71) Applicant: VERISIGN, INC., Reston, VA (US)

(72) Inventors: Swapneel Sheth, Fairfax, VA (US); Andrew West, Reston, VA (US)

(73) Assignee: VERISIGN, INC., Reston, VA (US)

( * ) Notice: Subject to any disclaimer, the term of this patent is extended or adjusted under 35 U.S.C. 154(b) by 371 days.

(21) Appl. No.: 15/685,656

(22) Filed: Aug. 24, 2017

(65) Prior Publication Data

US 2019/0068550 A1    Feb. 28, 2019

(51) Int. Cl.

| | | |
|---|---|---|
| *G06F 16/00* | (2019.01) | |
| *H04L 29/12* | (2006.01) | |
| *G06F 16/95* | (2019.01) | |
| *G06Q 30/06* | (2012.01) | |
| *G06F 16/951* | (2019.01) | |

(52) U.S. Cl.
CPC .......... *H04L 61/3025* (2013.01); *G06F 16/95* (2019.01); *G06F 16/951* (2019.01); *G06Q 30/0631* (2013.01); *H04L 29/12641* (2013.01); *H04L 61/302* (2013.01)

(58) Field of Classification Search
None
See application file for complete search history.

(56) References Cited

U.S. PATENT DOCUMENTS

| | | | |
|---|---|---|---|
| 9,613,374 B2 | 4/2017 | Kamdar et al. | |
| 9,990,432 B1 * | 6/2018 | Lai | G06F 16/951 |
| 2010/0325253 A1 * | 12/2010 | Adelman | H04L 29/12594 |
| | | | 709/222 |
| 2015/0058330 A1 | 2/2015 | Carroll et al. | |
| 2015/0242511 A1 | 8/2015 | Arians et al. | |
| 2018/0211320 A1 * | 7/2018 | Kamdar | G06Q 40/06 |

OTHER PUBLICATIONS

"Whois" Internet Citation; Jan. 4, 2005 (Jan. 4, 2005). XP003006638. Retrieved from the Internet: URL:http://www.en.wikipedia.orgjwiki/whois [retrieved on Feb. 9, 2007].
Extended European Search Report dated Dec. 20, 2018, EP Application No. 18 19 0799, pp. 1-10.

* cited by examiner

*Primary Examiner* — Son T Hoang
(74) *Attorney, Agent, or Firm* — MH2 Technology Law Group, LLP (57) ABSTRACT

Disclosed are techniques for ranking domain names for presentation to a user. The techniques include obtaining, over a computer network, domain name data including, for each of a plurality of training domain names, respective user information; generating, by at least one electronic processor, a model relating at least features of each of the plurality of training domain names to respective user features derived from the respective user information; obtaining novel user information for a novel user; obtaining a plurality of domain names; ranking the plurality of domain names, using the model and novel input data including novel user features derived from the novel user information, according to predicted domain name suitability for the novel user; and providing a ranked list of the plurality of domain names.

12 Claims, 4 Drawing Sheets

SYSTEM FOR AND METHOD OF RANKING DOMAIN NAMES BASED ON USER PROPERTIES

FIELD

This disclosure relates generally to internet domain names, e.g., registering internet domain names.

BACKGROUND

The Domain Name System ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources including web pages using names.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. Registrars typically employ domain name suggestion processes, which accept as input one or more domain query strings (which may be registered domain names) and output corresponding or alternate domain names, which the user may subsequently register. The registrar chosen by the registrant asks the registrant to provide various contact and technical information, and the registrant provides payment to the registrar. The registrar then keeps a record of the contact information and submits the technical information to the registry. Registrars typically include many hardware computer servers. For ease of discussion, a registrar is identified with its hardware computer servers unless otherwise specified or clear from context. Further, an internet user has a hardware client computer. For ease of discussion, a registrant is identified with its hardware client computer unless otherwise specified or clear from context.

SUMMARY

According to some embodiments, a method of ranking domain names for presentation to a user is presented. The method includes obtaining, over a computer network, domain name data including, for each of a plurality of training domain names, respective user information; generating, by at least one electronic processor, a model relating at least features of each of the plurality of training domain names to respective user features derived from the respective user information; obtaining novel user information for a novel user; obtaining a plurality of domain names; ranking the plurality of domain names, using the model and novel input data including novel user features derived from the novel user information, according to predicted domain name suitability for the novel user; and providing a ranked list of the plurality of domain names.

Various optional features of the above embodiments include the following. The domain name data may further include, for each of the plurality of training domain names, a respective indication of whether it was registered by a respective user. The generating a model may include training a binary classifier with a plurality of training vectors, where each of the plurality of training vectors includes domain name data for a respective training domain name, user information for a respective user, and registration information indicating whether the respective user registered the respective training domain name. The ranking the plurality of domain names may include applying the model to each of a plurality of feature vectors, where each of the plurality of feature vectors includes domain name data for a respective domain name of the plurality of domain names and the novel user features; the applying the model to each of a plurality of feature vectors may include obtaining, from the model, a respective score for each of the plurality of feature vectors; and the ranking the plurality of domain names may include ranking the plurality of domain names according to respective score. The providing the ranked list of the plurality of domain names may include offering to register at least one of the plurality of domain names to the novel user. Each of the plurality of training domain name may have been registered by a respective user represented by the respective user information. The generating the model may include representing each respective user information as a vector in a hyperspace, such that a plurality of vectors are produced; the obtaining the plurality of domain names may include: representing the novel user features as a novel user vector in the hyperspace; determining a plurality of proximate vectors of the plurality of training vectors that are within a threshold distance in the hyperspace to the novel user vector; and determining the plurality of domain names as domain names registered to users represented by the plurality of proximate vectors; and the ranking the plurality of domain names may include: determining a plurality of distances, each of the plurality of distances including a distance, in the hyperspace, from a vector representing the novel user features to a respective proximate vector; and ranking the plurality of domain names according to inverses of the plurality of distances. The providing the ranked list of the plurality of domain names may include providing the ranked list of domain names to a domain name suggestion process; and the method may further include providing to the novel user at least one domain name output by the domain name suggestion process. The method may further include offering to register to the novel user the at least one domain name output by the domain name suggestion process. The obtaining respective user information may include obtaining respective user information from a social network; and the method may further include offering to register at least one domain name derived from the ranked list of the plurality of domain names to the novel user within a webpage of the social network.

According to some embodiments, a computer-implemented system for ranking domain names for presentation to a user is presented. The system includes at least one electronic server computer communicatively coupled to a computer network and to at least one electronic processor configured to perform a method of: obtaining, over the computer network, domain name data including, for each of a plurality of training domain names, respective user information; generating, by the at least one electronic processor, a model relating at least features of each of the plurality of training domain names to respective user features derived from the respective user information; obtaining, by the at least one electronic server or the at least one electronic processor, novel user information for a novel user; obtaining, by the at least one electronic server or the at least one electronic processor, a plurality of domain names; ranking, by the at least one electronic processor, the plurality of domain names, using the model and novel input data including novel user features derived from the novel user information, according to predicted domain name suitability for the novel user; and providing, by the at least one electronic server or the at least one electronic processor, a ranked list of the plurality of domain names.

Various optional features of the above embodiments include the following. The domain name data may further include, for each of the plurality of training domain names, a respective indication of whether it was registered by a respective user. The generating a model may include training a binary classifier with a plurality of training vectors, where each of the plurality of training vectors includes domain name data for a respective training domain name, user information for a respective user, and registration information indicating whether the respective user registered the respective training domain name. The ranking the plurality of domain names may include applying the model to each of a plurality of feature vectors, where each of the plurality of feature vectors includes domain name data for a respective domain name of the plurality of domain names and the novel user features; the applying the model to each of a plurality of feature vectors may include obtaining, from the model, a respective score for each of the plurality of feature vectors; and the ranking the plurality of domain names may include ranking the plurality of domain names according to respective score. The providing the ranked list of the plurality of domain names may include offering to register at least one of the plurality of domain names to the novel user. Each of the plurality of training domain name may have been registered by a respective user represented by the respective user information. The generating the model may include representing each respective user information as a vector in a hyperspace, such that a plurality of vectors are produced; the obtaining the plurality of domain names may include: representing the novel user features as a novel user vector in the hyperspace; determining a plurality of proximate vectors of the plurality of training vectors that are within a threshold distance in the hyperspace to the novel user vector; and determining the plurality of domain names as domain names registered to users represented by the plurality of proximate vectors; and the ranking the plurality of domain names may include: determining a plurality of distances, each of the plurality of distances including a distance, in the hyperspace, from a vector representing the novel user features to a respective proximate vector; and ranking the plurality of domain names according to inverses of the plurality of distances. The providing the ranked list of the plurality of domain names may include providing the ranked list of domain names to a domain name suggestion process; and the method may further include providing to the novel user at least one domain name output by the domain name suggestion process. The at least one electronic processor may be further configured to offer to register to the novel user the at least one domain name output by the domain name suggestion process. The obtaining respective user information may include obtaining respective user information from a social network; and the at least one electronic processor may be further configured to offer to register at least one domain name derived from the ranked list of the plurality of domain names to the novel user within a webpage of the social network.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments provide novel approaches for ranking (e.g., sorting) domain names on a personalized basis. Such personalization may be specific to an individual user, such as a potential registrant. The domain names may be ranked according to a prediction of how interested the particular user might be in registering such names. Note that, because the rankings are personalized, two potential domain name registrants may be given different presentations/orderings of the same set of domain names.

In more detail, some embodiments employ machine learning techniques based on properties of the user, such as gender, hobbies, country of residence, etc., as well as properties of domain names, e.g., length, language, top-level domain, etc., as well as contextual properties, e.g., the potential forum of the sale. The rankings may take into account prior domain name purchasing behavior of individuals that are determined to be similar to the user. Such embodiments provide for more relevant names being more prominently presented to the potential registrant, thus increasing overall registrations for, e.g., a registrar.

A first class of embodiments accepts a set of domain names that may be produced by any technique, and ranks them according to personalized, predicted user interest. Such embodiments may utilize historic purchase data (e.g., from domain name suggestion logs) that specify who did, and did not, buy certain domain names. Such data may be supplied to any of a number of suitable machine learning techniques, where the domain name, user properties, and contextual data form the feature set, and the purchasing/conversion decision constitutes the label. Training the machine learning technique may produce a model that links user properties to their tendencies in domain name purchasing (e.g., "German domain registrants are not particularly averse to purchasing longer than average domain names"). The model may output a numeric (e.g., real-valued) score representing the predicted attractiveness for each name to the potential registrant. Such scores may be used to sort and present the domain names to the potential registrant. Thus, the trained model may be applied to sort a set of domain names, such as those output by a name suggestion tool that was queried by a potential registrant, in a manner customized to the interests of the specific potential registrant.

A second class of embodiments both generates and ranks domain names according to personalized, predicted user interest. Such embodiments may utilize historic purchase data (e.g., from WHOIS databases) that specify who purchased certain domain names. Such data may be supplied to a machine learning algorithm, which may be unsupervised or semi-supervised. The algorithm may produce a model that maps registrants to a high-dimensional hyperspace according to their personal user properties. A potential registrant may be mapped to this same hyperspace, and the domain names registered by nearby users (in the hyperspace representation) may be identified and ranked according to proximity to the user's representation. Such domain names may be supplied to the potential registrant, e.g., with a display indicating that "people like you have bought these domains". Alternately, or in addition, the identified domain names may be supplied to a known domain name suggestion process, and the output of the process provided to the potential registrant as domain names candidates for registration. In either case, the presentation to the potential registrant may be performed in any of a number of suitable settings, such as advertisements in social media. Note that in this class of embodiments, the models may not account for properties of the domain names. In sum, some embodiments in this second class may project user properties into a hyperspace, where clustering and nearest-neighbor techniques can be used to identify nearby users and the names they bought.

These and other embodiments and variations are presented in detail below.

Figure 1:
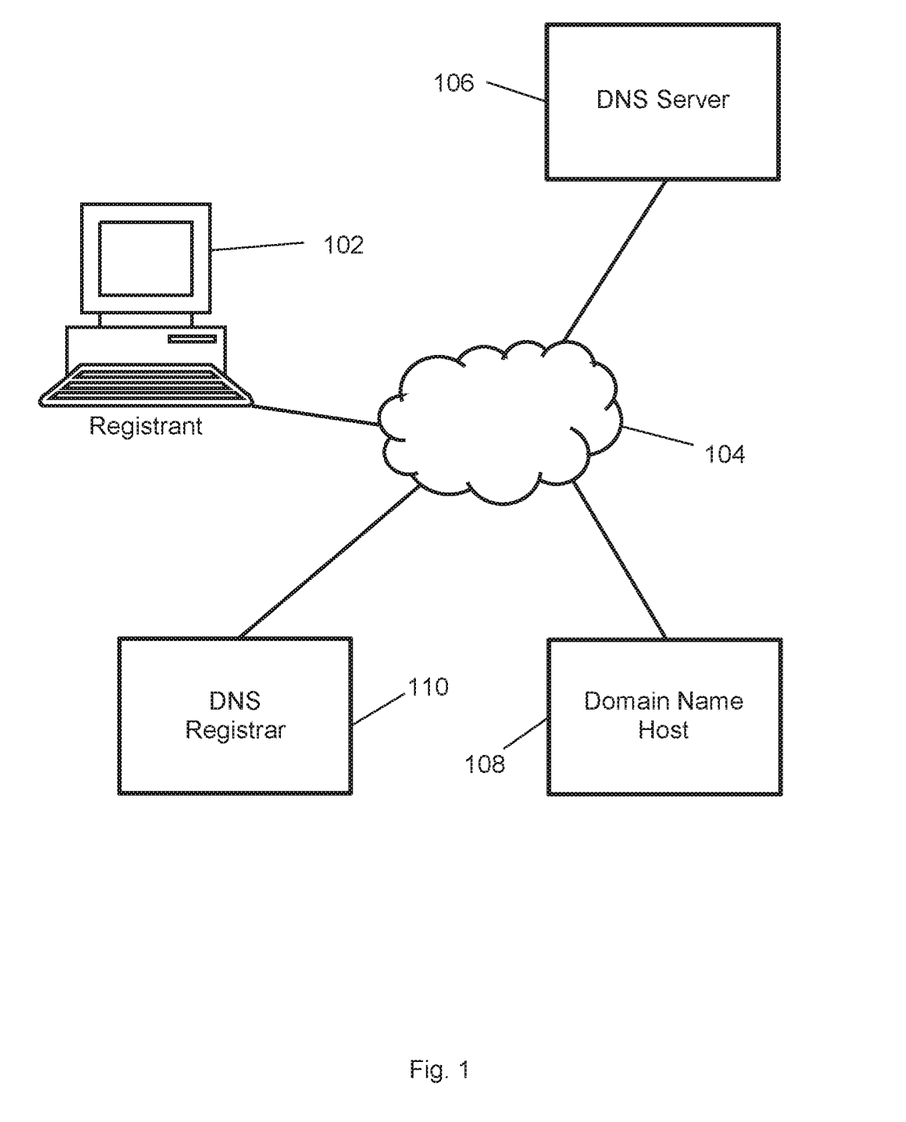
FIG. 1 is a schematic diagram illustrating a portion of the DNS according to some embodiments.

FIG. 1 is a schematic diagram illustrating a portion of the DNS according to some embodiments. As depicted in FIG. 1, a domain name (e.g., www.example.com) can be registered to an internet user known as a "registrant" 102 by a company known as a "registrar" 110. In general, registrars compete with one another to register domain names for registrants. An internet user interacts with a registrar 110 through the internet 104 to purchase, or "register", a domain name, thereby becoming a registrant 102, also referred to as an "owner", of that name. The registrar 110 asks the registrant 102 to provide various contact and technical information for the registration. The registrar 110 then keeps a record of the contact information and submits the technical information to the DNS registry (e.g., registry 402 of FIG. 4).

When any internet user (not shown) attempts to navigate his or her browser to the registered domain through internet 104, the browser contacts a DNS server 106, which provides an IP address for the domain name host 108 of the registered domain by looking up an appropriate DNS resource record for the domain name. The internet user's browser then navigates to the domain name host 108 using its IP address to retrieve the resource of the domain name, e.g., content.

Figure 2:
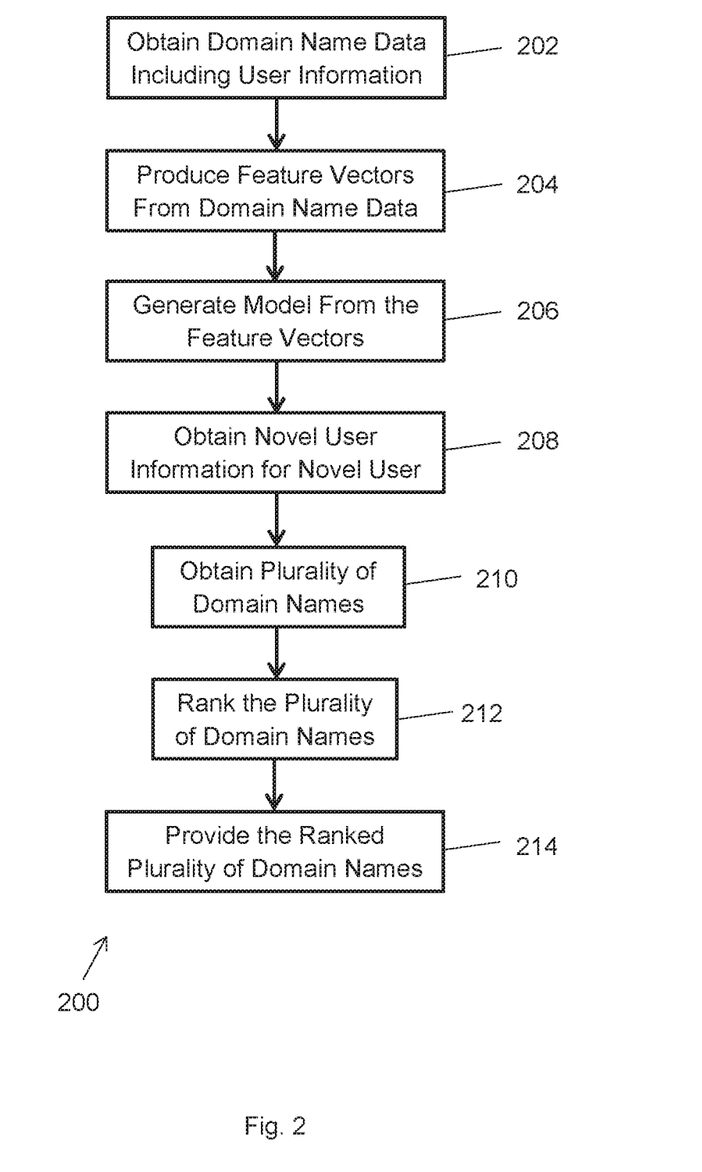
FIG. 2 is a flow diagram of a method according to some embodiments.

FIG. 2 is a flow diagram of a method 200 according to some embodiments. Method 200 may be implemented by a system such as system 400 as shown and described below in reference to FIG. 4.

As described above, there are two main classes of embodiments disclosed herein (though embodiments are not limited to the two described classes). The first embodiment class may rank any set of domain names according to personalized, predicted user interest. This first class of embodiments may train a machine learning algorithm using domain name registration data that specifies, for each of a plurality of domain names, whether or not a user that was presented with an opportunity to register such domain names actually did or did not register such domain names.

The second class of embodiments both generates and ranks domain names according to personalized, predicted user interest. This second class of embodiments may train a machine learning algorithm using domain name registration data that specifies, for each of a plurality of domain names, a user that actually registered the domain name.

The two classes of embodiments share many commonalities, such as ranking domain names based on properties of a user that is presented with the ranked domain names, or domain names derived therefrom, and are therefore both described in reference to method 200 as follows.

At block 202, method 200 obtains domain name data. The domain name data may be obtained over a computer network such as the internet from an electronically stored database, referred to herein as a "conversion database". Such a conversion database may store in persistent memory a plurality of fields/structures (e.g., columns in a database) describing at least a user and a respective domain (e.g., one row per domain name/user information/other data). Some embodiments also include one or both of a conversion label and/or a context descriptor. These data are described in detail below. At this stage in the process, the conversion database data may be structured or unstructured in nature.

In the conversion database, the "user" refers to an identifier for, or description of, a user that was presented with an opportunity to register a domain name (the user may have actually registered the domain name, or not). This could take on various forms, including but not limited to: (1) a unique user identifier which can be subsequently joined to user properties, (2) a large unstructured body of content (e.g., social network profile) from which user properties can later be derived, or (3) explicit user properties (as detailed in greater depth below). A user description does not necessarily have to uniquely identify an individual.

In the conversion database, the "domain" is an identifier of a domain that was at least offered to the respective user for registration. The respective user may or may not have actually registered the respective domain name.

In the conversion database, the "conversion label" is a binary label indicating whether the respective user purchased the respective domain. For purposes of illustration, the labels may be represented using the values "true" and "false".

In the conversion database, the "context" is a descriptor indicating the circumstances by which the user was presented with the opportunity to register the domain. Suitable contexts include, by way of non-limiting example, data indicating that the user was presented with the domain name on a social network web page, data indicating that the user searched for the domain name at a registrar's website, or data indicating that the user was emailed an offer to purchase the domain name.

For the first class of embodiments, method 200 at block 202 obtains domain name data from the conversion database that includes at least, for each of a plurality of domain names, respective user information and respective conversion label information. For the first class of embodiments, the conversion database data may be obtained from one or more name suggestion processes. Such a name suggestion process may generate, select, or otherwise obtain one or more domain names, and present them to a user, e.g., on a social network (or a registrar's website, e.g., of registrar 420), for registration. In such embodiments, the conversion database may be constructed such that the user field(s) include one or more of an identity of a social network (or registrar, e.g., registrar 420), a user identifier (e.g., a name), and any structured or unstructured information that can be gleaned about the user (e.g., from that user's public profile on the social network). If the user registered any of the proposed names, or a proposed name was registered within, say, 24 hours of its suggestion, then the conversion database may set the respective conversion label to "true". The context field(s) may contain an initial registered domain name that was provided to the name suggestion process to generate the proposed domain names for the user, if applicable.

For the second class of embodiments, method 200 at block 202 obtains domain name data from the conversion database that includes, for each of a plurality of domain names, respective user information. For the second class of embodiments, the conversion database data may be obtained from a WHOIS database, for example. In the second class of embodiments, the data represented in the conversion database is slightly different, because the domain field represents a domain that was registered, and therefore the conversion label is always set to "true". (The second class of embodiments may therefore omit the conversion label field altogether in the conversion database.) The context field may be left empty. The user fields may contain at least one or more of: (a) the primary contact email address associated with the domain name in the WHOIS database, possibly for joining against third-party databases, (b) location data on the user as provided in the WHOIS address fields, and/or (c) any user properties that can be parsed from the content hosted at the domain.

At block 204, method 200 produces feature vectors from the domain name data obtained at block 202. Although the particular suitable machine learning algorithms may be different between the first class of embodiments and the second class of embodiments, both classes of embodiments may utilize feature vectors to train or develop the corresponding models generated per block 206. In particular, the feature vectors may be constructed from the data in the conversion database, typically, though not necessarily, one feature vector per conversion database row.

Such feature vectors may be produced as follows. The feature vectors may be of fixed length. The elements of these vectors are intended to capture properties that are likely meaningful factors in making domain purchase decisions. Each element (a.k.a., "feature" or "attribute") may be either numeric or drawn from a finite set of possible values (i.e., categorical). Therefore, producing the feature vectors may involve: (1) Identifying features relevant to domain purchasing that can be supported by conversion database fields, (2) extracting these well-defined features from conversion database fields, possibly from unstructured data, and (3) formatting the extracted data into data structures suitable for the particular embodiments.

For purposes of illustration rather than limitation, the feature vectors may be represented and constructed from multiple constituent vectors (e.g., any, or any combination, of a user feature vector, a domain feature vector, a context feature vector, and a label vector) as follows.

User feature vector: $U=[u_1, u_2 \ldots u_{m-1}, u_m]$. Features may include, but are not limited to, the user's: gender, age, socioeconomic class, primary natural language, geographical location, number of domains previously purchased, website ownership status, and other personal information for a respective user.

Domain feature vector: $D=[d_1, d_2 \ldots d_{n-1}, d_n]$. Features may include, but are not limited to, the proposed domain's:

Lexical properties: length, top-level domain, hyphen presence, numerical character presence, vowel-to-consonant ratio, ease of tokenizing into component words, pronounceability metrics, commonality of character n-grams within, and other lexical, e.g., syntactical, properties.

Semantic properties: thematic category, presence of words (e.g., location naming words), presumed natural language, and other semantic properties.

Traffic and metadata properties: non-existent domain ("NXD") traffic, prior registration history, cost to purchase, size of top-level domain being proposed, and other traffic and metadata properties.

Similarity to user properties: Latent Semantic Analysis ("LSA")/Latent Dirichlet Allocation ("LDA") topic model vectors may be computed for the user's social profiles and component words in the proposed domain name. Such techniques are useful for modeling semantics of words based on topics. A similarity measure between these vectors on [0,1] (i.e., with output values that lie on the interval from zero to one, inclusive) provide information as to whether the domain's genre is an interest of the respective user.

Context feature vector: $C=[c_1, c_2 \ldots c_{p-1}, c_p]$. Features of context vectors may be application dependent. In the context of a name suggestion website, for example, features could include, but are not limited to: presentation rank of proposed domain, length difference between queried name and proposed domain, edit distance between queried name and proposed domain, top-level domain agreement between query name and proposed name, and other context features Other context vector features may include a forum category, indicating the particular forum (e.g., social network, registrar website, email) in which the user was presented with the opportunity to register the domain name.

Conversion label: $[L] \in \{true, false\}$. The conversion label indicates whether a user registered the respective domain name. For the second class of embodiments, the context label may be fixed as "true", or may be omitted altogether, with the understanding that the feature vectors exclusively represent domain names that have been registered.

Thus, at block 204, method 200 may convert each conversion database row into one or more limited feature vectors as described above, possibly including a label vector. Such limited feature vectors may then be concatenated into a larger, full feature vector. Next, for conversion databases with y rows, the generated feature vectors may be concatenated into a feature matrix F:

$$F_1 = [U_1 \text{ concat } D_1 \text{ concat } C_1 \text{ concat } L_1]$$

$$F_2 = [U_2 \text{ concat } D_2 \text{ concat } C_2 \text{ concat } L_2]$$

$$\ldots$$

$$F_y = [U_y \text{ concat } D_y \text{ concat } C_y \text{ concat } L_y]$$

Such a matrix (which may be stored in a flat text file format such as Comma Separated Vales, or "CSV", or Attribute-Relation File Format, or "ARFF"), can then be provided as input to a machine learning algorithm. With the feature vectors formed, method 200 proceeds to generate a model based on a machine learning algorithm.

At block 206, method 200 generates a model based on a machine learning algorithm and the feature vectors produced at block 204. Depending on the particular class of embodiments the algorithm and model may differ.

For the first class of embodiments, method 200 may employ a supervised machine learning algorithm to train a computer-implemented model. The classification algorithm utilized may be capable of binary classification. This includes, but is not limited to, techniques such as decision trees, neural networks, support vector machines, logistic regression, and Bayesian networks. Depending on the algorithm, categorical features may utilize Sequential Minimal Optimization ("SMO") and/or Minor Component Analysis ("MCA") to be mapped into a numerical space. The matrix F, described above, may be used as the training data over which a classification algorithm operates, outputting a model, denoted here as $M_1$. Techniques such as cross-validation can be utilized to estimate predictive accuracy over unseen data. Similarly, known methods may be employed to determine which features have the most predictive weight. In some embodiments, features have been engineered such that attributes from the constituent user feature vector U are prominent in the model, as this implies that user properties are indicative of conversion decisions. The resulting model is used below at block 212 to rank the domain names obtained at block 210.

For the second class of embodiments, method 200 may employ an unsupervised or semi-supervised learning algorithm to produce a trained computer learning model. Unlike the first class of embodiments, which utilize feature vectors that include conversion labels of both "true" and "false" to draw distinctions between buy/no-buy behaviors, the second class of embodiments may utilize feature vectors that omit such classification. This is the case, for example, for embodiments that utilize bulk WHOIS data as the conversion database. Thus, the second class of embodiments may utilize feature vectors of the form $U=[u_1, u_2 \ldots u_{m-1}, u_m]$ for every distinct user in the conversion database. In the second class of embodiments, every user is mapped to a point in m-dimensional hyperspace (possibly using SMO/MCA to map categorical features into numerical space). This results in a model, denoted here as $M_2$, that is used at block 210 to obtain a plurality of domain name and at block 212 to rank the obtained domain names.

At block 208, method 200 obtains information respecting a novel user, referred to as "novel user information". The novel user (e.g., internet user 416 of FIG. 4) may or may not have been represented in the conversion database. The actions of this block may be the same for either class of embodiments described herein. There are many ways in which method 200 may obtain such novel user data. According to some embodiments, such data is input by the novel user in a web page, such as a registrar's web page (e.g., a web page of registrar 420). According to some embodiments, the novel user information is scraped from the novel user's social network web page. According to some embodiments, the novel user information is obtained from user registration data in any of a variety of services that require user registration (e.g., messaging applications, web services, telephone subscriptions, internet service provider records, etc.). Also part of this block, the novel user information may be formatted into a constituent novel user feature vector, U', as described above in reference to block 204.

At block 210, method 200 obtains a plurality of domain names. The actions of this block may differ, depending on whether the particular embodiment falls into the first or second class.

For the first class of embodiments, method 200 at block 210 may obtain a plurality of domain names from a variety of sources. The names may be obtained over a computer network such as the internet, and/or retrieved from persistent storage, for example. The domain names may be unregistered at the time of the obtaining. According to some embodiments, the plurality of domain names for this second class of embodiments may include anything from all available domains in a given zone, down to a smaller set of domain names produced by an extremely narrow and user-personalized generation procedure, e.g., a name suggestion process available on a registrar's website (e.g., a website of registrar 420). The precise origin of the plurality of domain names is not of consequence for sorting purposes.

For the second class of embodiments, method 200 at block 210 may obtain the plurality of domain names as follows. Method 200 may project the novel user vector U' into the in m-dimensional hyperspace (possibly using SMO/MCA to map categorical features into numerical space) of the respective model $M_2$. Method 200 may then apply nearest-neighbor identification techniques (e.g., K Nearest Neighbors, or "KNN") to identify a plurality of domain names that have been registered by the identified nearest neighbors. To that end, the process may first identify the nearest neighbor users, and then consult a secondary source to identify the corresponding registered domain names. The secondary source may be a WHOIS database, or the conversion database itself, according to some embodiments.

At block 212, method 200 ranks the plurality of domain names obtained per block 210, using personal information of the novel user that is included in the novel user vector U'. The process of block 212 differs between the first and second class of embodiments.

For the first class of embodiments at block 212, the model $M_1$ may take as input the concatenated feature vectors (e.g., [U' concat D' concat C']) for a novel user, proposed domain, and, for some embodiments, context of interest. That is, for the first class of embodiments, block 212 produces a plurality of feature vectors from the (same) novel user vector U' and each of the plurality of domain names D' obtained per block 210, possibly also including respective context information C'. As output, it predicts whether the input is likely to result in a conversion ("true" or "false"). This binary distinction is produced via a threshold on a real-valued predictive "score". This score is the basis for sorting a set of candidate domain names.

In more detail for the first class of embodiments, the model $M_1$ may be any of a variety of machine learning models, and the particular real-valued predictive scores may differ accordingly. For example, decision trees, typically assign weights to each decision. After traversing a path per normal usage of such models, these weights are summed and compared to a threshold for purposes of categorization. Embodiments of the second class may utilize these summed weights as the real-valued score representing the predicted attractiveness for each name to the potential registrant, U'. As another example, neural networks typically operate by assigning weights to each of a plurality of classes into which novel data is classified. Embodiments of the second class may take the highest weight, or the weight corresponding to a "true" classification as to registration, as the real-valued score representing the predicted attractiveness for each name to the potential registrant. As yet another example, support vector machines typically operate by projecting novel data into a high-dimensional hyperspace, and determining whether the projected data lies on one side or the other of a boundary defined by a hyperplane or hypersurface for classification. Embodiments of the second class may take a geometric distance from boundary as the real-valued score representing the predicted attractiveness for each name to the potential registrant. Other trained models $M_1$ may utilize other produced real values as scores representing the predicted attractiveness for each name to the potential registrant. Once such scores are obtained for each domain name obtained per block 210, such domain names are ranked according to respective score.

For the second class of embodiments, for block 212, method 200 may rank the domain names obtained per block 210 as follows. Each of the obtained domain names was obtained at block 210 by association by registration with a user whose feature vector was proximate to the novel user's feature vector U' in the hyperspace defined by model $M_2$. Thus, the domain names may be ranked according to geometric distance from U' to the respective registrants. That is, each domain is associated with a registrant, and the score for the domain name may be taken as the geometric distance from a feature vector for such registrant to U'. Once such scores are obtained for each domain name obtained per block 210, such domain names are ranked according to respective score.

At block 214, method 200 provides the ranked plurality of domain names to any of a variety of entities. Such entities may depend in part on whether the ranked domain names were produced according to an embodiment of the first class or an embodiment of the second class.

For the first class of embodiments, the ranked domain names may be provided to the novel user represented by U' per block 214. The presentation may be made in any of a variety of forums. By way of non-limiting examples, the ranked list may be provided to the novel user on a registrar's website (e.g., a website of registrar 420), or as an advertisement displayed on any of a variety of web pages, such as social media web pages. In more detail, the ranked list of domain names produced by embodiments of the first class are typically unregistered, and may be presented to the novel user in an advertisement that presents an offer to the novel user to register any or all such domain names. The domain names may be presented along with a message to the effect of, "you might find these domain names to be of particular interest to you". The novel user may click on a link in the advertisement to begin a domain name registration process, e.g., implemented by a registrar such as registrar 420. Note that the advertisement may be presented to the novel user in any forum, by way of non-limiting example, a social medial web page.

For the second class of embodiments, the ranked domain names may be provided to a variety of entities per block 214. According to embodiments of the second class, the ranked domain names may already be registered. Thus, some embodiments provide the ranked list of domain names to a domain suggestion process that accepts registered domain names and identifies corresponding unregistered domain names. In such embodiments, the domain names from the ranked list may be input to such a process individually, and the output domain names ranked in accordance with the ranking of the respective input domain name. The results of this process may be presented to the novel user in an advertisement that presents an offer to the novel user to register the output domain names. Similar to embodiments of the first class, the output domain names may be presented along with a message to the effect of, "you might find these domain names to be of particular interest to you". The novel user may click on a link in the advertisement to begin a domain name registration process, e.g., implemented by a registrar such as registrar 420. Note that the advertisement may be presented to the novel user in any forum, by way of non-limiting example, a social medial web page.

In other embodiments of the second class, the ranked list of domain names is presented to the novel user in a manner that indicates that they are already registered, but that they might serve as inspiration for registering alternate domain names. For example, some embodiments of the second class present the ranked list of domain names to the novel user on a web page, such as a social medial web page, with a message to the effect of, "users like you recently registered domains [a], [b], and [c]". Such a presentation has advertising value. While the listed names are not available, they may serve as inspiration and trigger independent searching by the novel user for similar names. If the example names are interesting to the novel user, it follows that the likelihood of an ad-click and downstream sale is higher than if the examples were randomly selected.

Figure 3:
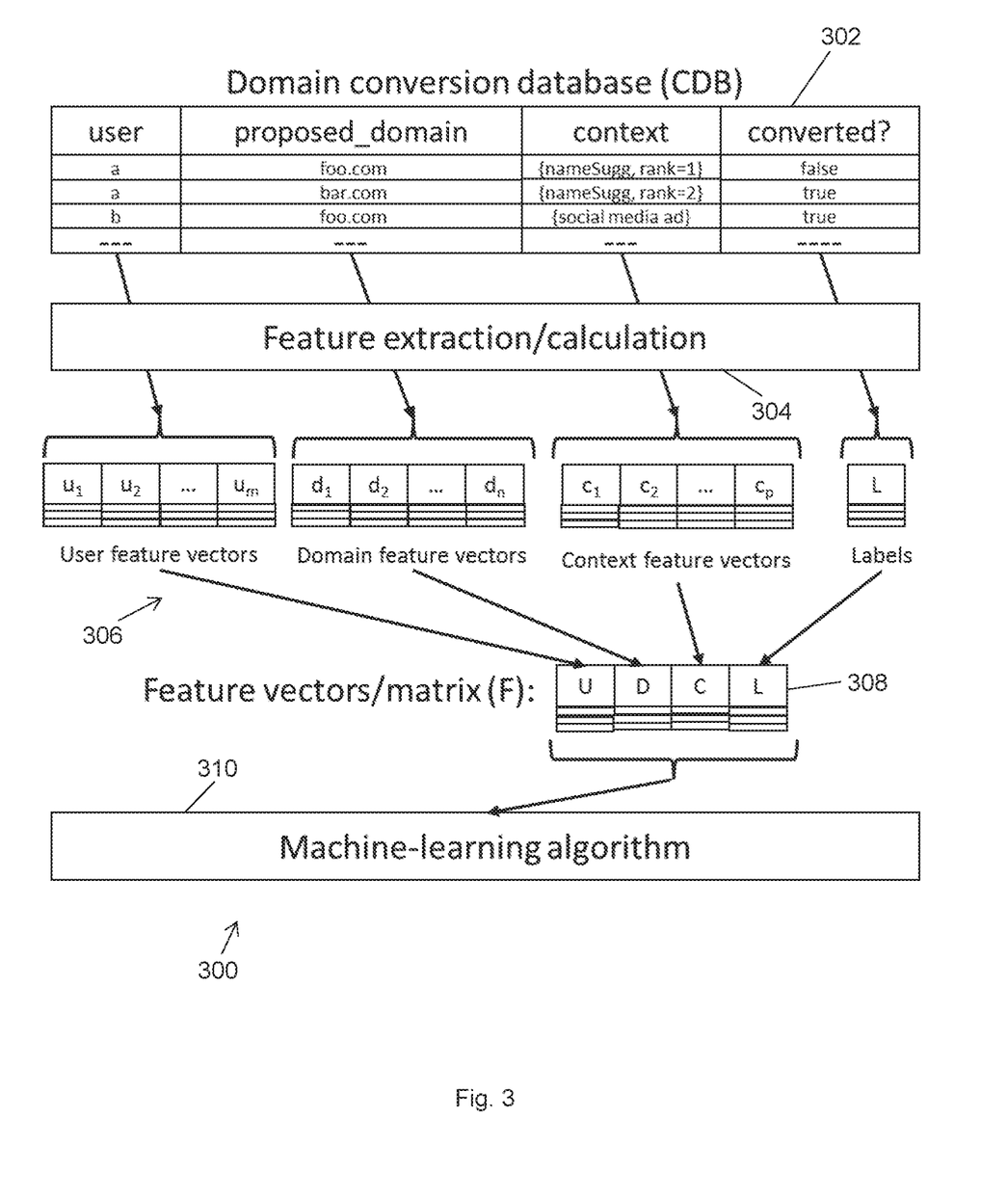
FIG. 3 is a hybrid diagram illustrating the process of FIG. 2 according to some embodiments.

FIG. 3 is a hybrid diagram 300 illustrating the process of FIG. 2 according to some embodiments. As shown, the process may be conceptualized as starting with conversion database 302, from which features are extracted 304 and formatted into constituent feature vectors 306. The constituent feature vectors 306 are concatenated into full feature vectors 308 (e.g., in matrix format), and used to train a machine learning algorithm 310. This generates a model, which is then used to rank a set of domain names, which may be provided from an external source (e.g., for the first class of embodiments) or obtained from the model itself (e.g., for the second class of embodiments). The ranking is particular to features of a novel user and constructed to produce a ranking according to personalized, predicted user interest. The ranked list of domain names may then be provided to the novel user for registration (if unregistered) or provided to a domain name suggestion process (whether registered or not).

Figure 4:
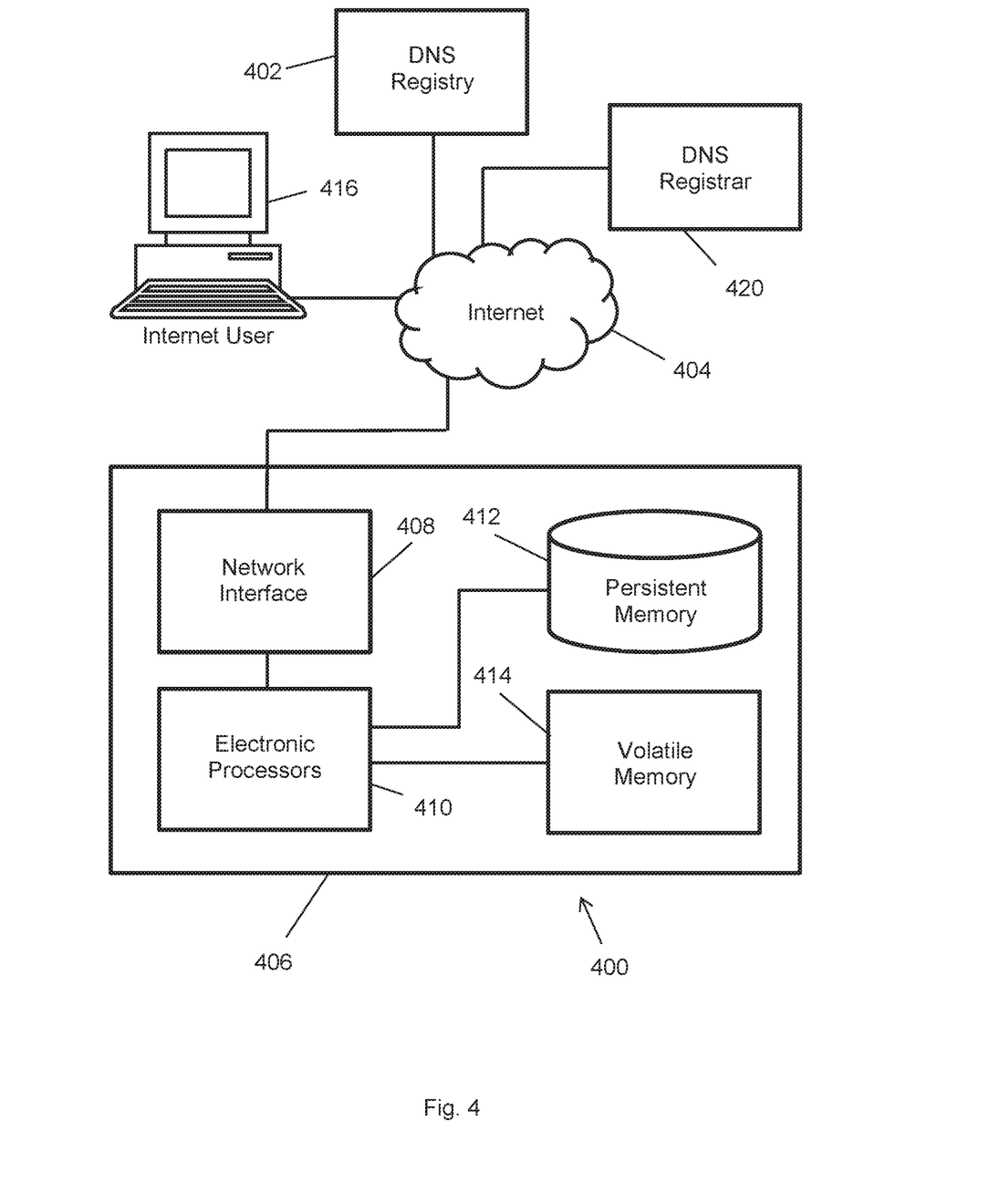
FIG. 4 is a schematic diagram illustrating a system according to some embodiments.

FIG. 4 is a schematic diagram of a system 400 suitable for implementing methods (e.g., method 200 of FIG. 2) according to some embodiments. System 400 may be based around an electronic hardware internet server computer 406, which may be communicatively coupled to the internet 404. Server computer 406 includes network interface 408 to affect the communicative coupling to the internet 404. Network interface 408 may include a physical network interface, such as a network adapter. Server computer 406 may be a special-purpose computer, adapted for reliability and high-bandwidth communications. Thus, server computer 406 may be embodied in a cluster of individual hardware server computers, for example. Alternately, or in addition, server computer 406 may include redundant power supplies. Persistent memory 412 may be in a Redundant Array of Inexpensive Disk drives (RAID) configuration for added reliability, and volatile memory 414 may be or include Error-Correcting Code (ECC) memory hardware devices. Server computer 406 further includes one or more electronic processors 410, which may be multi-core processors suitable for handling large amounts of information. Electronic processors 410 are communicatively coupled to persistent memory 412, and may execute instructions stored thereon to effectuate the techniques disclosed herein, e.g., method 200 as shown and described in reference to FIG. 2. Electronic processors 410 are also communicatively coupled to volatile memory 414.

Server computer 406 is communicatively coupled to DNS registry 402 and/or DNS registrar 420. (According to some embodiments, server computer 406 is provided by a registrar or registry for implementation of the disclosed method.) The communication between server computer 406 and DNS registry 402 or DNS registrar 420 allows for obtaining registered domain names (e.g., for the second class of embodiments), determining whether domain names are currently registered, and also permits users (e.g., internet user 416) to register unregistered domain names as disclosed herein.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of ranking a plurality of domain names for presentation to a user, the method comprising:
obtaining, over a computer network, domain name data comprising, for each of a plurality of training domain names, respective user information representing a respective user;
generating, by at least one electronic processor, a model relating at least features of each of the plurality of training domain names to respective user features derived from the respective user information, wherein the generating the model comprises representing each respective user information as a training vector in a hyperspace, whereby a plurality of training vectors are produced;
obtaining novel user information representing a novel user;
obtaining the plurality of domain names, wherein the obtaining the plurality of domain names comprises:
representing a novel user feature derived from the novel user information as a novel user vector in the hyperspace;
determining a plurality of proximate vectors of the plurality of training vectors that are within a threshold distance in the hyperspace to the novel user vector; and
determining the plurality of domain names as domain names that have been registered to users represented by the plurality of proximate vectors;
ranking the plurality of domain names, using the model and novel input data comprising the novel user feature according to predicted domain name suitability for the novel user, wherein the ranking the plurality of domain names comprises:
determining a plurality of distances, each of the plurality of distances comprising a distance, in the hyperspace, from a vector representing the novel user feature to a respective proximate vector; and
ranking the plurality of domain names according to an inverse of the plurality of distances; and
providing a ranked list of the plurality of domain names to the user.

2. The method of claim 1, wherein the providing the ranked list of the plurality of domain names comprises offering to register at least one of the plurality of domain names to the novel user.

3. The method of claim 1, wherein each of the plurality of training domain names has been registered by a respective user represented by the respective user information.

4. The method of claim 3, wherein the providing the ranked list of the plurality of domain names comprises providing the ranked list of the plurality of domain names to a domain name suggestion process; and
wherein the method further comprises providing to the novel user at least one domain name output by the domain name suggestion process.

5. The method of claim 4, further comprising offering to register to the novel user the at least one domain name output by the domain name suggestion process.

6. The method of claim 1, wherein the obtaining the respective user information comprises obtaining the respective user information from a social network; and
the method further comprises offering to register at least one domain name derived from the ranked list of the plurality of domain names to the novel user within a webpage of the social network.

7. A computer-implemented system for ranking domain names for presentation to a user, the system comprising at least one electronic server computer communicatively coupled to a computer network and to at least one electronic processor configured to perform a method of:
obtaining, over the computer network, domain name data comprising, for each of a plurality of training domain names, respective user information representing a respective user;
generating, by the at least one electronic processor, a model relating at least features of each of the plurality of training domain names to respective user features derived from the respective user information, wherein the generating the model comprises representing each respective user information as a training vector in a hyperspace, whereby a plurality of training vectors are produced;
obtaining novel user information representing a novel user;

obtaining the plurality of domain names, wherein the obtaining the plurality of domain names comprises:
representing a novel user feature derived from the novel user information as a novel user vector in the hyperspace;
determining a plurality of proximate vectors of the plurality of training vectors that are within a threshold distance in the hyperspace to the novel user vector; and
determining the plurality of domain names as domain names that have been registered to users represented by the plurality of proximate vectors;
ranking the plurality of domain names, using the model and novel input data comprising the novel user feature according to predicted domain name suitability for the novel user, wherein the ranking the plurality of domain names comprises:
determining a plurality of distances, each of the plurality of distances comprising a distance, in the hyperspace, from a vector representing the novel user feature to a respective proximate vector; and
ranking the plurality of domain names according to an inverse of the plurality of distances; and
providing a ranked list of the plurality of domain names to the user.

8. The system of claim 7, wherein the providing the ranked list of the plurality of domain names comprises offering to register at least one of the plurality of domain names to the novel user.

9. The system of claim 7, wherein each of the plurality of training domain names has been registered by a respective user represented by the respective user information.

10. The system of claim 9, wherein the providing the ranked list of the plurality of domain names comprises providing the ranked list of the plurality of domain names to a domain name suggestion process; and
wherein the method further comprises providing to the novel user at least one domain name output by the domain name suggestion process.

11. The system of claim 10, wherein the at least one electronic processor is further configured to offer to register to the novel user the at least one domain name output by the domain name suggestion process.

12. The system of claim 7, wherein the obtaining the respective user information comprises obtaining the respective user information from a social network; and
the at least one electronic processor is further configured to offer to register at least one domain name derived from the ranked list of the plurality of domain names to the novel user within a webpage of the social network.

* * * * *